A. W. PIERCE.
Door-Springs.
No. 199,740. Patented Jan. 29, 1878.
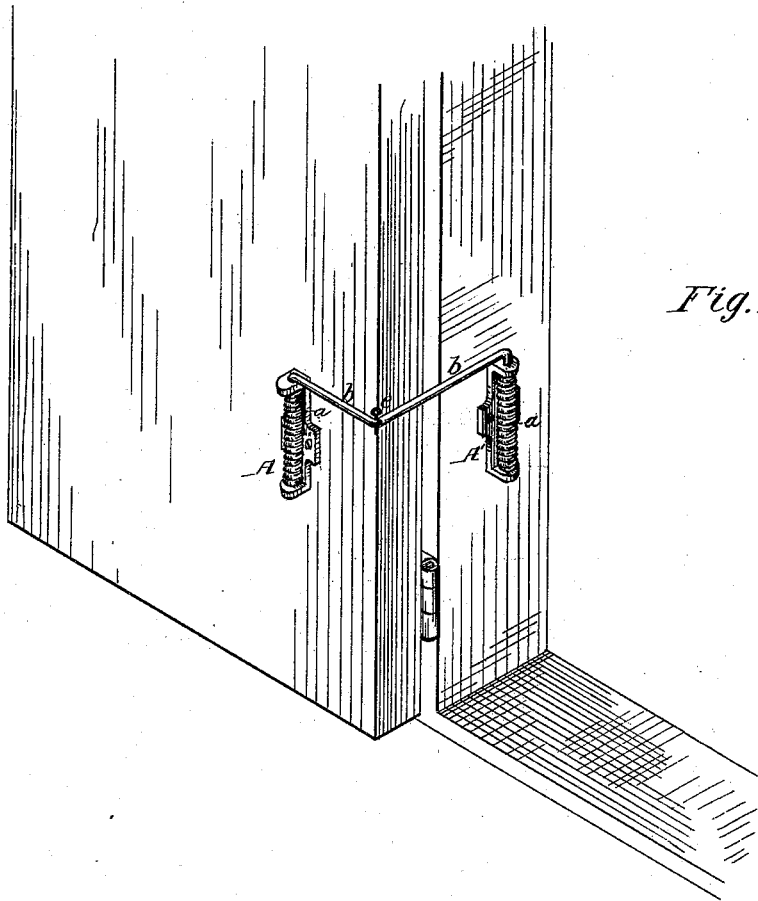
Fig. 1.
Fig. 2.
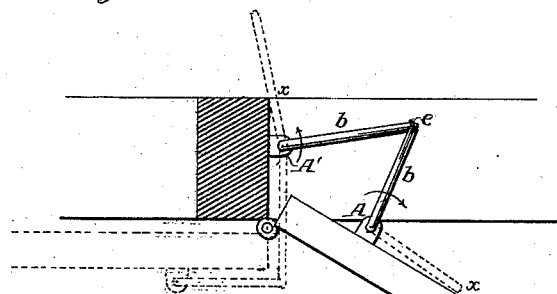
Attest:
Fred Benjamin
Edwin A. Welch
Inventor
Adelbert W. Pierce
By his attorney
Charles E. Foster

UNITED STATES PATENT OFFICE.

ADELBERT W. PIERCE, OF OCONTO, WISCONSIN.

IMPROVEMENT IN DOOR-SPRINGS.

Specification forming part of Letters Patent No. 199,740, dated January 29, 1878; application filed January 3, 1878.

*To all whom it may concern:*

Be it known that I, ADELBERT W. PIERCE, of Oconto, Oconto county, Wisconsin, have invented an Improved Spring, of which the following is a specification:

The object of my invention is a spring, constructed as fully described hereinafter, for ready application to a door, gate, shutter, or other object, and to permit an extended movement of the latter, and capable of being easily thrown out of operation; and this I effect by combining two brackets, carrying spring-arms, connected detachably in the manner shown in the drawings, and hereinafter more fully described and claimed.

Figure 1 is a perspective view, showing a door provided with my improved spring, and Fig. 2 a sectional plan.

A and A' represent brackets of any suitable construction, carrying springs $a$, which tend to operate upon arms $b$ projecting beyond the brackets, and to turn them in the direction shown by the arrows, Fig. 2. The brackets are secured, one to the door, gate, or other movable portion of the object to which the spring is applied, and the other to the frame, the two being arranged in the same plane, so that the arms $b$ may be brought together at the ends, where they are detachably secured by means of a pin, $e$, or other suitable device.

The tendency of each arm to assume the position shown by the dotted lines $x$, Fig. 2, will insure the closing of the door whenever the same is released after being opened, while the respective arrangement of the two parts of the spring will permit the most extended movement of the door, allowing it to swing back to the position shown by dotted lines $y$, Fig. 2, without unduly straining the springs, and without reducing the leverage or the power which the springs exert.

Should it be necessary at any time to throw the spring out of operation, it can be done by simply removing the pin $e$, when each arm will assume the position shown by dotted lines $x$, Fig. 2, and the door will be free.

In the drawings I have shown each arm as composing a part of an L-shaped rod, the vertical portion of which turns in the bracket, and is operated on by a coiled spring.

It will be apparent, however, that the lower end of the rod may be fixed in the bracket so as to obtain a torsional action when the projecting end is turned, and that other kinds of springs may be substituted for the spiral springs for controlling the connected arms carried by the brackets.

I claim as my invention—

The within-described spring, consisting of brackets A A' and spring-arms $b$ $b$, connected together detachably at the ends, as and for the purpose described.

In testimony whereof I have signed my name to this specification in the presence of two subscribing witnesses.

ADELBERT WESLEY PIERCE.

Witnesses:
W. B. MITCHELL,
GEO. D. KNAPP.